US010315216B2

(12) United States Patent
De Zeeuw et al.

(10) Patent No.: US 10,315,216 B2
(45) Date of Patent: *Jun. 11, 2019

(54) HIGHLY CURABLE COATING FORMULATION FOR THE INNER SURFACES OF CANS

(71) Applicant: Henkel AG & Co. KGaA, Duesseldorf (DE)

(72) Inventors: Ard De Zeeuw, Duesseldorf (DE); Wolfgang Schneider, Langenfeld (DE); Thomas Moeller, Duesseldorf (DE); Nicole Auweiler, Dormagen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 176 days.

This patent is subject to a terminal disclaimer.

(21) Appl. No.: 14/737,912

(22) Filed: Jun. 12, 2015

(65) Prior Publication Data

US 2015/0275019 A1 Oct. 1, 2015

Related U.S. Application Data

(63) Continuation of application No. PCT/EP2013/076963, filed on Dec. 17, 2013.

(30) Foreign Application Priority Data

Dec. 17, 2012 (DE) .................. 10 2012 223 355

(51) Int. Cl.
*B05D 1/02* (2006.01)
*B05D 7/22* (2006.01)
*B05D 1/12* (2006.01)
*C09D 5/02* (2006.01)
*B65D 25/14* (2006.01)
*C09D 123/08* (2006.01)
*B65D 1/12* (2006.01)

(52) U.S. Cl.
CPC ............ *B05D 1/02* (2013.01); *B65D 1/12* (2013.01); *B65D 25/14* (2013.01); *C09D 5/02* (2013.01); *C09D 123/0869* (2013.01); *C09D 123/0876* (2013.01); *B05D 7/22* (2013.01); *B05D 2202/25* (2013.01)

(58) Field of Classification Search
CPC ............ C08L 29/04; C09D 123/0869; C09D 123/0876; C09D 5/02; B05D 1/02; B05D 2202/25; B05D 7/22; B65D 1/12; B65D 25/14
See application file for complete search history.

(56) References Cited

U.S. PATENT DOCUMENTS

| 7,659,341 | B2 | 2/2010 | Wamprecht et al. | |
|---|---|---|---|---|
| 9,365,727 | B2* | 6/2016 | Smith | |
| 2003/0187128 | A1* | 10/2003 | Shiba | C09D 123/0869 524/556 |
| 2008/0193689 | A1 | 8/2008 | Masselin et al. | |
| 2009/0215937 | A1* | 8/2009 | Kikuchi | C08L 23/0869 524/300 |
| 2012/0125801 | A1 | 5/2012 | Kainz et al. | |
| 2014/0023782 | A1 | 1/2014 | Kunz et al. | |

FOREIGN PATENT DOCUMENTS

| CN | 1621465 A | 6/2005 |
|---|---|---|
| CN | 102533057 A | 7/2012 |
| DE | 2514397 A1 | 12/1975 |
| EP | 1361248 A1 | 11/2003 |
| EP | 2031006 A1 | 3/2009 |
| EP | 2505625 A1 | 10/2012 |
| JP | 2005075878 A | 3/2005 |
| JP | 2005075879 A | 3/2005 |
| JP | 20060022127 A | 1/2006 |
| WO | 2004053183 A2 | 6/2004 |
| WO | 2006045017 A1 | 4/2006 |

OTHER PUBLICATIONS

International Search Report for PCT/EP2013/076954, dated Mar. 19, 2014.
International Search Report for PCT/EP2013/076963, dated Feb. 21, 2014.

* cited by examiner

*Primary Examiner* — Satya B Sastri
(74) *Attorney, Agent, or Firm* — Mary K. Cameron

(57) ABSTRACT

The present invention relates to a water-based can inner coating based on a copolymer or a copolymer blend of at least one aliphatic and acyclic alkene having at least one α,β-unsaturated carboxylic acid in water-dispersed form, wherein the can inner coating contains a water-soluble curing agent selected from inorganic compounds of the elements Zr and/or Ti, so that the need for using organic hardener systems can be largely avoided. The present invention further relates to a method for the internal coating of tin cans or aluminum cans, in which the previously mentioned can inner coating is directly applied to the metallic inner surfaces of the cans and cured without any need to carry out a conversion treatment for improving coating adhesion of the inner surfaces of the cans.

22 Claims, No Drawings

HIGHLY CURABLE COATING FORMULATION FOR THE INNER SURFACES OF CANS

STATEMENT REGARDING FEDERALLY SPONSORED RESEARCH

NONE

The present invention relates to a water-based can inner coating based on a copolymer or a copolymer blend of at least one aliphatic and acyclic alkene with at least one α,β-unsaturated carboxylic acid in a water-dispersed form, wherein the can inner coating contains a water-soluble curing agent, selected from inorganic compounds of the elements Zr and/or Ti, so that it is possible to largely omit organic curing agent systems. In addition, the present invention relates to a method for coating the interiors of tin cans or aluminum cans, in which the aforementioned can inner coating is applied directly to the metallic inner surfaces of the cans and cured without requiring a prior conversion treatment of the inner surfaces of the cans to improve the adhesion of the coating.

In the food industry, tin plate strip is considered to be a suitable material for manufacturing packaging units for holding aqueous fluids or preserved foods because tin plate releases only small amounts of potentially harmful tin salts to the food product in contact with the tin surface even over a longer period of time due to the electrochemically noble tin layer. Tin plate strip is therefore an important starting material for food packaging, for example, for manufacturing cans for holding beverages. Aluminum strip is also a suitable starting material for manufacturing cans for bottling beverages due to its passive oxide layer. In addition, aluminum salts that are absorbed in small amounts by the fluid are not objectionable from a health standpoint. The packaging industry applies an organic protective layer to the inner surface of the can when manufacturing cans or, alternatively, uses strip material already provided with an organic protective coating for manufacturing cans. Coating the inner surfaces with the organic coating prevents the metallic inner surfaces of the cans from coming in direct contact with the fluid. On the one hand, a significantly reduced corrosion of the base material is thereby achieved, while, on the other hand, the input of metal salts is minimized, so there is no negative effect on the taste of the food, even in the case of a prolonged storage or provisioning of the beverage cans.

Another aspect of can manufacturing concerns the composition of the coating which conventionally consists of epoxy resins based on bisphenol A. Such epoxies, based on bisphenol A, are suspected of having estrogenic effects and being toxic to the reproductive system of males. When cured coating formulations come in contact with acidic aqueous foods, bisphenol A can be released from the coating into the food stored in it. Curing of the coating and the associated crosslinking of the ingredients of the coating are almost never complete, so that unreacted bisphenol A-based epoxies can also enter food by diffusion. There is therefore a demand for formulations that are free of bisphenol A for the inner coating of cans for storing foods, especially since there are various national legislative initiatives, prompted by EU Directive 2002/72/EU, among others, for establishing maximum limits for the migration of bisphenol A from outer packagings into foods.

US 2008/0193689 discloses an epoxy-based coating composition suitable for use as a can coating, which contains, in addition to the modified epoxy resin, mono- and difunctional low-molecular organic compounds capable of reacting with the epoxy resin. The coating is formulated so that, after curing, only very small amounts of unreacted bisphenol A-based epoxies remain in the coating, so that when using the formulation as a can inner coating, only traces of bisphenol A from the cured coating can enter the food which is stored.

However, EP 2031006 proposes can inner coatings based on specific alicyclic epoxies in order to thereby avoid the incorporation of bisphenol A-based epoxies.

WO 2006/045017 makes available a coating formulation for beverage cans comprising lattices of ethylenically unsaturated monomers and an aqueous dispersion of an acid-functional polymer in the presence of amines, wherein the lattices for crosslinking are composed at least in part from monomers having a glycidyl group. Such can inner coatings can be formulated to be free of bisphenol A-based epoxies.

In addition, there are known alternatives to epoxy-based can inner coatings in the prior art that can be applied by spray methods, yield a homogeneous film when cured and have a high flexibility with good adhesion of the coating and resistance to aqueous compositions at the same time.

EP 2505625 thus discloses a water-based can inner coating containing a copolymer or copolymer blend of at least one aliphatic and acyclic alkene with at least one α,β-unsaturated carboxylic acid in water dispersed form, wherein the acid number of the copolymer or copolymer blend is at least 20 mg KOH/g but no more than 200 mg KOH/g and at least one water-dispersed or water-soluble curing agent selected from the group of aminoplastics and/or the group of carbodiimides.

The object of the present invention is, on the one hand, to supply another can inner coating as an alternative to epoxy-based coatings, which is characterized in that homogeneous, well-crosslinked coatings with a high resistance to fluids are formed in the curing process, and on the other hand, to further improve the corrosion-preventing properties of the coating and the adhesion of the coating. In addition, the coating formulation must be suitable for application to the can inner surfaces by spray method and must form coating films having a high flexibility after curing in order to prevent the coating from chipping off when shaping the can cylinders.

It has surprisingly been found that the use of a curing agent system based on inorganic compounds of the elements Zr and/or Ti permits excellent crosslinking of water-dispersed copolymers in the sub-micrometer range, based on α,β-unsaturated carboxylic acids, so that it is possible to completely eliminate organic curing agent systems for curing the can coating. Based on the fact that essentially a binder ingredient is now being used in the can inner coating, it is now possible to produce coating films that are highly homogeneous chemically. In addition, the can inner surface coming in contact with fluids has excellent corrosion protection because of the inorganic curing agent contained in the can coating, and coating adhesion is improved in such a way that a wet chemical pretreatment step for applying a corrosion-preventing adhesive base for the coating, which would otherwise be standard in coating cans, may be omitted.

The object of the present invention is therefore achieved by means of a water-based can inner coating, containing, in addition to water:

a) a copolymer or a copolymer blend of at least one aliphatic and acyclic alkene with at least one α,β-unsaturated carboxylic acid in water-dispersed form, wherein the acid number of the copolymer or copolymer blend is at least 20 mg KOH/g but no more than 200 mg KOH/g, and at least 20%, but no more than 60%, of the acid groups of the copolymer or copolymer blend in water-dispersed form are present in neutralized form, and b) at least one water-soluble curing agent based on inorganic compounds of the elements Zr and/or Ti, wherein the dispersed polymer ingredients of the water-based coating have a D50 value of less than 1 μm and wherein no more than 0.1% by weight of water-soluble and water-dispersed organic curing agents with amino groups, imine groups or carbodiimide groups are present.

According to the invention, cans are understood to refer to metallic containers for filling, storing and provisioning foods, in particular beverages.

In this context, a can inner coating is a coating formulation that is applied to form a coating layer on the inner surfaces of the can, forming a film which is then cured to prevent the metallic can material from coming directly in contact with the food in the filling, storage and provisioning of same.

According to the invention, a water-based coating comprises a dispersion and/or emulsion of organic polymers in a continuous aqueous phase, wherein an aqueous phase in the context of the present invention is also understood to be a homogeneous mixture of water and a water-miscible solvent. The term "in water-dispersed form" thus means that the respective polymer is present in the continuous aqueous phase in a solid-dispersed form or a liquid-dispersed form.

According to the invention, a copolymer blend refers to blends of chemically and/or structurally different copolymers of at least one aliphatic and acyclic alkene with at least one α,β-unsaturated carboxylic acid. For example, copolymers having different alkenes or different α,β-unsaturated carboxylic acids as the comonomers or having a different number of otherwise identical comonomers in the copolymer may be present concurrently in a copolymer blend of a coating formulation according to the invention.

The acid number is a characteristic number that is to be determined experimentally according to the invention and is a measure of the number of free acid groups in the copolymer or in the copolymer blend. The acid number is determined by dissolving a weighed amount of the copolymer or copolymer blend in a solvent mixture of methanol and distilled water in a volume ratio of 3:1 and then titrating potentiometrically with 0.05 mol/L KOH in methanol. The potentiometric measurement is performed using a combination electrode (LL-Solvotrode® from Metrohm; reference electrolyte 0.4 mol/L tetraethyl ammonium bromide in ethylene glycol). The acid number here corresponds to the amount of KOH added in milligrams per gram of copolymer and/or copolymer blend at the turning point in the potentiometric titration curve.

The D50 value indicates that 50% by volume of the dispersed polymeric ingredients of the can inner coating has a size less than the value given. The D50 value can be determined from volume-weighted cumulative particle size distributions. The particle size distribution curve can be measured with the help of corresponding dynamic light scatter methods, which are familiar to those skilled in the art.

The dispersed polymeric ingredients of the water-based coating have a D50 value of less than 1 μm and can therefore crosslink optimally in the presence of the inorganic curing agent according to component b) during the drying and curing of a wet film of the can inner coating according to the invention. A coarser dispersion of the polymeric ingredients, in particular the copolymers or copolymer blend according to component a) of the present invention, makes homogeneous crosslinking more difficult because a permeation of the water-soluble curing agent with the water-dispersed polymeric ingredients according to component a) can take place only to a very limited extent. In this context, such a dispersion of the polymeric ingredients in which a D50 value of less than 0.5 μm is achieved is preferred according to the invention. Conversely, the viscosity of the can inner coating increases with an even finer dispersion of the polymeric ingredients so that the D50 value preferably does not fall below 0.1 μm in order to continue to ensure simple application of the can inner coating.

The copolymer or the copolymer blend of the aliphatic and acyclic alkene with an α,β-unsaturated carboxylic acid with the given acid value already exhibits good adhesion of the coating as a thin film fused onto metal surfaces, in particular on surfaces of tin plate and aluminum. In addition, the acid groups impart the inherent property of being self-emulsifying to the copolymer or the copolymer blend, so that in aqueous phase even in the absence of emulsifiers, microparticulate aggregates can be formed by using shear forces. The presence of the copolymers or copolymer blend in the form of microparticulate aggregates imparts thixotropic properties to the coating according to the invention, so that a homogeneous wet film of the water-based coating can be applied to the inner surfaces of the can and persists until a film has formed and has cured and no longer runs together in the interior of the can under the influence of gravity.

If the acid number of the copolymer or the copolymer blend of alkenes and α,β-unsaturated carboxylic acids is less than 20 mg KOH/g, then a cured coating formulation according to the type described in the present invention will have inadequate adhesion to metal surfaces and therefore will not be suitable as a film-forming ingredient of can inner coatings. Conversely, if the acid number of the copolymers or the copolymer blend of alkenes and α,β-unsaturated carboxylic acids is above 200 mg KOH/g, this causes an inadequate barrier effect with respect to the corrosive action of ions in aqueous media as a film-forming ingredient in can inner coatings, and also the coating thus formed is comparatively less resistant to water at temperatures above 60° C.

The amount by weight of the aliphatic and acyclic alkenes in the copolymer or in the copolymer blend is preferably at least 40% by weight, especially preferably at least 60% by weight, but preferably no more than 95% by weight. This ensures that the coating cured on the inner surface of the can will have a permeability for ions, and the swelling of same in contact with aqueous media will be reduced to the maximum extent with adequate wetting capability and adhesion of the coating to the can material at the same time.

Preferred aliphatic and acyclic alkenes of the copolymers or copolymer blend contained in the coating according to the invention are selected from ethene, propene, 1-butene, 2-butene, isobutene, 1,3-butadiene and/or 2-methylbuta-1,3-diene, especially preferably ethene. Preferred α,β-unsaturated carboxylic acids of the copolymers or the copolymer blends contained in the coating according to the invention are selected from cinnamic acid, crotonic acid, fumaric acid, itaconic acid, maleic acid, acrylic acid and/or methacrylic acid, especially preferably acrylic acid and/or methacrylic acid, in particular acrylic acid.

Additional comonomers which may be an additional component of the copolymers or copolymer blend in a can inner coating according to the invention are selected from esters of α,β-unsaturated carboxylic acids, preferably linear or branched alkyl esters of acrylic acid and/or methacrylic acid with no more than 12 carbon atoms in the aliphatic radical. Such comonomers improve the adhesion of the cured can inner coating to metal surfaces due to an increased mobility of the basic structure of the polymer, which in turn facilitates the orientation of the acid groups, which have an affinity for the surface, with respect to the metal surface. This effect is manifested in particular at low acid numbers of the copolymer of less than 100 mg KOH/g. It is found that, in general, low acid numbers of the copolymers or copolymer blend improve the barrier properties of the cured coating formulation according to the invention on exposure to aqueous media. Accordingly, copolymers or copolymer blends which additionally contain the comonomers described above and have acid numbers of less than 100 mg KOH/g, in particular less than 60 mg KOH/g, are preferred according to the invention.

The copolymer or the copolymer blend of the can inner coating according to the invention preferably contains less than 0.05% by weight, especially preferably less than 0.01% by weight, of oxygen bound to epoxy.

For good film-forming results when curing the can inner coating, it is necessary for the water-dispersed copolymer or the water-dispersed copolymer blend of the can inner coating to enter the molten state after volatilization of the aqueous phase. To meet this requirement, copolymers or copolymer blends having as such a glass transition temperature of no more than 80° C., especially preferably no more than 60° C., are preferred. Copolymers or copolymer blends comprised of alkenes and α,β-unsaturated carboxylic acids with a weight-average molecular weight $M_w$ of no more than 20,000 u usually have glass transition temperatures substantially lower than 100° C., so that copolymers or copolymer blends with a weight-average molecular weight of no more than 20,000 u, in particular no more than 15,000 u, are preferred in can inner coatings according to the invention.

In a preferred formulation of the can inner coating according to the invention, the acid groups of the water-dispersed copolymer or the water-dispersed copolymer blend are present at least partially in neutralized form. This measure increases the self-emulsifying capacity of the copolymers in the aqueous phase, thus resulting in more stable coating formulations with smaller particle sizes of the dispersed copolymers. Accordingly, the can inner coating preferably also contains a neutralizing agent.

Ammonia, amines, metallic aluminum and/or zinc, preferably in powder form, as well as water-soluble oxides and hydroxides of the elements Li, Na, K, Mg, Ca, Fe(II) and Sn(II) are preferably suitable as neutralizing agents additionally contained in such a preferred formulation in the can inner coating. At this point, those skilled in the art are aware that the neutralizing agents enter into neutralization reactions with the components of the coating according to the invention in accordance with their function and therefore as such are optionally detectable only indirectly in the form of their reaction products in these preferred formulations. For example, metallic aluminum or zinc powder in the aqueous phase will react with the release of hydrogen to form the corresponding hydroxides, which in turn bring about the neutralization of acid groups of the copolymer or copolymer blend, so that ultimately only the cations of the elements aluminum or zinc can be detected in the coating according to the invention. The neutralizing agents are therefore understood to be only a formulation aid of the can inner coating according to the invention.

Particularly preferred neutralizing agents include ammonia and amines because these enter the gas phase when the coating is cured at an elevated temperature and therefore do not remain behind in the cured can inner coating. Preferred amines that can be used as neutralizing agents in the can inner coatings according to the invention include morpholine, hydrazine, hydroxylamine, monoethanolamine, diethanolamine, triethanolamine, dimethylethanolamine and/or diethylethanolamine.

The acid groups of the copolymer or copolymer blend in the can inner coating according to the invention are preferably neutralized to such an extent that at least 20%, especially preferably at least 30%, of the acid groups are present in neutralized form. In a preferred embodiment of the can inner coating, high degrees of neutralization above 50%, preferably above 40%, are to be avoided because the almost completely neutralized copolymers are already dissolved in water in significant amounts and therefore are not present in dispersed form, which results in a high viscosity of the coating, so that such formulations are less suitable as can inner coatings because of their rheological properties.

In this context, it is preferable for neutralizing agents to be added to the formulation of the can inner coating in such an amount that, based on 1 g of the copolymer or the copolymer blend, at least $4/z$ μmol, preferably at least $6/z$ μmol, each multiplied by the acid number of the copolymer or the copolymer blend, of neutralizing agent is present, but preferably no more than $10/z$ μmol, especially preferably no more than $8/z$ μmol, multiplied by the acid number of the copolymer or the copolymer blend. The divisor z here is a natural number and corresponds to the equivalent number of the neutralization reaction. The equivalent number indicates how many moles of acid groups of the copolymer or the copolymer blend can be neutralized by one mole of neutralizing agent.

A can inner coating according to the invention contains as the curing agent water-soluble inorganic compounds of the elements Zr and/or Ti. Such inorganic compounds are water soluble in the sense of the present invention if their solubility in deionized water ($\kappa < 1$ μScm$^{-1}$) at 20° C. is at least 1 g/L in each case, based on the respective element Zr and/or Ti. Preferred representatives of these water-soluble inorganic curing agents are selected from alkoxides and/or carbonates, especially preferably from tetrabutoxy zirconate, tetrapropoxy zirconate, tetrabutoxy titanate, tetrapropoxy titanate, ammonium zirconium carbonate and/or ammonium titanium carbonate, in particular preferably ammonium zirconium carbonate.

For adequate crosslinking of the copolymer and/or the copolymer blend according to component a) of the can inner coating, on the one hand, and good coating adhesion, on the other hand, which makes it unnecessary to have an additional coating adhesion-improving pretreatment of the can inner surfaces prior to applying the can inner coating, it is preferable if the amount by weight of the curing agent according to component b), determined as the amount by weight of the elements Zr and/or Ti, based on the solids content of the copolymer or copolymer blend according to component a), divided by the dimensionless acid number of the copolymer or copolymer blend according to component a) in grams of KOH/g, is greater than $0.04 \cdot X_{Zr} + 0.02 \cdot X_{Ti}$. Conversely, it is preferable for this weight ratio divided by the dimensionless acid number of the copolymer or copolymer blend according to component a) in grams of KOH/g to be preferably less than $0.12 \cdot X_{Zr} + 0.06 \cdot X_{Ti}$ in order to obtain stable formulations of the can inner coating. $X_{Zr}$ and $X_{Ti}$ are the respective mass fractions of the elements Zr or Ti to the curing agent according to component b), based on the total amount of the elements Zr and Ti of the curing agent.

Another advantage of can inner coatings according to the invention is that it is possible to completely omit organic curing agents containing amino groups, imine groups or carbodiimide groups. Therefore, in a preferred embodiment of the can inner coating according to the invention, less than 0.01% by weight and especially preferably no water-soluble or water-dispersed organic curing agents with amino groups, imine groups or carbodiimide groups are contained therein.

However, the can inner coating according to the invention may additionally have one or more organic polymers or copolymers with hydroxyl groups, but not those based on aromatic epoxies, preferably polymers and/or copolymers of vinyl alcohol, wherein the hydroxyl number of the organic polymers or copolymers is preferably at least 100 mg KOH/g. Such polymers or copolymers further increase the degree of crosslinking during curing of the can inner coating in the presence of the water-soluble inorganic curing agent. However, the amount by weight of these polymers and/or copolymers, based on the amount by weight of the copolymer or copolymer blend according to component a) of the can inner coating according to the invention, preferably amounts to no more than 20%, wherein preferably a total of no more than 5% by weight, especially preferably a total of no more than 1% by weight, of organic polymers or copolymers containing hydroxyl groups, but not those based on aromatic epoxies, is additionally included.

The hydroxyl number is a measure of the number of free hydroxyl groups in the polymer or in a polymer blend and is determined experimentally by potentiometric titration. For this purpose, a weighed amount of the polymer or polymer blend is heated for 45 minutes at 130° C. in a reaction solution of 0.1 mol/L phthalic anhydride in pyridine and mixed first with 1.5 times the volume of the reaction solution of pyridine and then with 1.5 times the volume of the reaction solution of deionized water ($\kappa$<1 $\mu$Scm$^{-1}$). The amount of phthalic acid released is titrated in this mixture by means of 1M sodium hydroxide solution. The potentiometric measurement is performed using a combination electrode (LL-Solvotrode® from Metrohm; reference electrolyte: 0.4 mol/L tetraethyl ammonium bromide in ethylene glycol). The hydroxyl number here corresponds to the amount of NaOH added per gram of polymer and/or polymer blend at the turning point of the potentiometric titration curve.

A preferred can inner coating according to the present invention contains at least 40% by weight water and a) 4-30% by weight, preferably 10-20% by weight, of the copolymer described above and/or the copolymer blend described above in dispersed form,
b) 0.05-4% by weight, preferably 0.1-2% by weight, of the at least one curing agent based on inorganic compounds of the elements Zr and/or Ti,
c) no more than 0.1% by weight of water-soluble organic curing agents with amino groups, imine groups or carbodiimide groups,
d) no more than 5% by weight of emulsifiers selected from nonionic amphiphiles with an HLB value of at least 8,
e) no more than 10% by weight, preferably no more than 5% by weight, of water-miscible organic solvents,
f) no more than 10% by weight of additives selected from wetting agents, flow control agents, foam suppressants, catalysts, film-forming agents, stabilizers and/or neutralizing agents.

The present invention also comprises a method for coating the interior of tin cans or aluminum cans, in which the inner surfaces of the cans are optionally first cleaned and then—with or without an intermediate rinsing step—a can inner coating containing the following is applied to the can inner surfaces:

a) a copolymer or a copolymer blend of at least one aliphatic and acyclic alkene with at least one $\alpha,\beta$-unsaturated carboxylic acid in water-dispersed form, wherein the acid number of the copolymer or the copolymer blend amounts to at least 20 mg KOH/g but no more than 200 mg KOH/g, and at least 20%, but no more than 60%, of the acid groups of the copolymer or copolymer blend in water-dispersed form are present in neutralized form, and
b) at least one water-soluble curing agent based on inorganic compounds of the elements Zr and/or Ti.

Can inner coatings that are considered to be inventive according to the present invention are suitable in particular for use in a method according to the invention.

In a preferred method according to the invention, the cleaned can does not pass through such a wet chemical treatment step that produces a conversion coating with at least 5 mg/m$^2$ based on such metal elements that are not components of the can material before applying the can inner coating, in particular no wet chemical treatment steps with chrome-free aqueous compositions containing water-soluble compounds of the elements Zr, Ti and/or Si and preferably less than 0.1% by weight of organic polymers. Cleaning the can inner surfaces before application of the can inner coating according to the invention serves to provide a metallic surface that has been largely freed of organic ingredients, and is preferably performed with alkaline to neutral aqueous cleaners known for the surface treatment of aluminum.

In the method according to the invention, the can inner coating is preferably applied to the inner surface of the can in a dry coating layer of at least 1 g/m$^2$, but preferably in a dry coating layer of no more than 10 g/m$^2$. A wet film of the can inner coating is preferably applied in a spray method, especially preferably in the so-called airless method in which the can inner coating is atomized airlessly and is thus applied to the surface of the material. In these spray methods, a predetermined amount of the can inner coating is introduced into the cleaned and dry can interior by means of spray guns while the can rotates about its own longitudinal axis to form a homogeneous wet film.

Subsequently, the wet film is cured to form a coating film on the can inner surfaces in a drying oven at temperatures in the range of 120° C. to 200° C. (object temperature). The curing process comprises the volatilization of the aqueous phase as well as the film-forming and crosslinking of the polymer ingredients.

What is claimed is:

1. A water-based can inner coating, which comprises, in addition to water:
a) a copolymer or a copolymer blend of one or more aliphatic acyclic alkenes, present in an amount of at least 40% by weight and no more than 95% by weight of total copolymer or copolymer blend weight, with one or more $\alpha,\beta$-unsaturated carboxylic acids in water-dispersed form and, optionally, additional comonomers selected from esters of $\alpha,\beta$-unsaturated carboxylic acids, wherein the total amount of said one or more aliphatic acyclic alkenes, $\alpha,\beta$-unsaturated carboxylic acids and optional additional comonomers comprises 100% by weight of the copolymer or copolymer blend, wherein the copolymer or the copolymer blend has acid groups wherein at least 20%, but not more than 60% of the total number of acid groups are present in neutralized form, and has an acid number of at least 20 mg KOH/g but not greater than 200 mg KOH/g;
b) one or more organic polymers or copolymers containing hydroxyl groups, which are not based on aromatic epoxies, wherein said one or more organic polymers or copolymers have a hydroxyl number of at least 100 mg KOH/q; and c) at least one water-soluble curing agent, based on inorganic compounds of elements Zr, Ti, and mixtures thereof, wherein the dispersed polymer ingredients of the water-based coating have a D50 value of less than 1 μm and wherein no more than 0.1% by weight of water-soluble and water-dispersed organic curing agents with amino groups, imine groups or carbodiimide groups are present.

2. The water-based can inner coating according to claim 1, wherein at least 30%, but no more than 50% of the acid groups of the copolymer or copolymer blend in water-dispersed form are present in neutralized form.

3. The water-based can inner coating according to claim 2, wherein the water-based can inner coating further comprises ammonia, amines, metallic Al, metallic Zn, water-soluble oxides of elements Li, Na, K, Mg, Ca, Fe(II), and Sn(II), and water-soluble hydroxides of elements Li, Na, K, Mg, Ca, Fe(II), and Sn(II) as a neutralizing agent for the acid groups of the copolymer or the copolymer blend.

4. The water-based can inner coating according to claim 3, wherein the neutralizing agent is selected from ammonia, amines and mixtures thereof.

5. The water-based can inner coating according to claim 4, wherein the neutralizing agent comprises amines selected from morpholine, hydrazine, hydroxylamine, monoethanolamine, diethanolamine, triethanolamine, dimethylethanolamine, diethylethanolamine, and mixtures thereof.

6. The water-based can inner coating according to claim 1, wherein the copolymer or the copolymer blend has a glass transition temperature of no more than 80° C.

7. The water-based can inner coating according to claim 1, wherein the aliphatic acyclic alkene is selected from ethene, propene, 1-butene, 2-butene, isobutene, 1,3-butadiene, 2-methyl-buta-1,3-diene and mixtures thereof.

8. The water-based can inner coating according to claim 1, wherein the α,β-unsaturated carboxylic acids are selected from cinnamic acid, crotonic acid, fumaric acid, itaconic acid, maleic acid, acrylic acid, methacrylic acid and mixtures thereof.

9. The water-based can inner coating according to claim 1, wherein the aliphatic acyclic alkenes are present in the copolymer or the copolymer blend in an amount of at least 60% by weight, but less than 95% by weight.

10. The water-based can inner coating according to claim 1, wherein the water-soluble curing agent based on inorganic compounds of the elements Zr, Ti and mixtures thereof is selected from alkoxides, carbonates and mixtures thereof.

11. The water-based can inner coating according to claim 1, wherein the water-soluble curing agent based on inorganic compounds of the elements Zr, Ti and mixtures thereof is selected from tetrabutoxy zirconate, tetrapropoxy zirconate, tetrabutoxy titanate, tetrapropoxy titanate, ammonium zirconium carbonate, ammonium titanium carbonate and mixtures thereof.

12. The water-based can inner coating according to claim 1, wherein an amount by weight of the curing agent according to component c), determined as the amount by weight of the elements Zr, Ti and mixtures thereof is set such that, the solids content of the copolymer or the copolymer blend according to component a) divided by acid number of the copolymer or copolymer blend in grams of KOH/g, is greater than the sum of $0.04 \cdot X_{Zr} + 0.02 \cdot X_{Ti}$ but less than the sum of $0.12 \cdot X_{Zr} + 0.06 \cdot X_{Ti}$ wherein $X_{Zr}$ and $X_{Ti}$ are respective mass fractions of the elements Zr or Ti of the curing agent according to component c), based on a total amount of the elements Zr and Ti of the curing agent.

13. The water-based can inner coating according to claim 1, containing at least 40% by weight of water and further comprising:

4-30% by weight of the copolymer or the copolymer blend a) in dispersed form;

0.05-4% by weight of the at least one curing agent 21 based on inorganic compounds of the elements Zr and/or Ti; and d) no more than 0.1% by weight of water-soluble organic curing agents with amino groups, imine groups or carbodiimide groups;

no more than 5% by weight of emulsifiers selected from nonionic amphiphiles with an HLB value of at least 8;

no more than 10% by weight of water-miscible organic solvents; and no more than 10% by weight of additives selected from the group consisting of wetting agents, flow control agents, foam suppressants, catalysts, film-forming agents, stabilizers, neutralizing agents and mixtures thereof.

14. A method for interior coating of tin cans or aluminum cans, comprising steps of:

1) optionally first cleaning inner surfaces of a tin or aluminum can and then—with or without an intermediate rinse step—

2) applying the water-based can inner coating according to claim 1 to the can inner surfaces.

15. The method according to claim 14, wherein the tin or aluminum can is a cleaned can and before application of the water-based can inner coating, the cleaned can does not pass through a wet chemical treatment step that produces a conversion coating with a coating weight of at least 5 mg/m$^2$, based on metal elements that are not ingredients of the can material.

16. The method according to claim 14, wherein the water-based can inner coating is applied to the can inner surfaces such that a dry coating layer of at least 1 g/m$^2$, but no more than 10 g/m$^2$ is formed.

17. The method according to claim 14, wherein the water-based can inner coating is applied by an airless spraying method.

18. The water-based can inner coating according to claim 1, wherein said additional comonomers selected from esters of α,β-unsaturated carboxylic acids are present in the copolymer or copolymer blend and the acid number of said copolymer or copolymer blend is less than 100 mg KOH/g.

19. The water-based can inner coating according to claim 18, wherein the esters of α,β-unsaturated carboxylic acids are linear or branched alkyl esters of acrylic acid and/or methacrylic acid with no more than 12 carbon atoms in the aliphatic radical and the acid number of said copolymer or copolymer blend is less than 60 mg KOH/g.

20. A water-based can inner coating, which comprises, in addition to water:

a) a copolymer or a copolymer blend of one or more aliphatic acyclic alkenes, present in an amount of at least 40% and no more than 95% by weight based on the total copolymer or copolymer blend weight, with one or more α,β-unsaturated carboxylic acids in water-dispersed form and, optionally, additional comonomers selected from esters of α,β-unsaturated carboxylic acids, wherein the total amount of said one or more aliphatic acyclic alkenes, α,β-unsaturated carboxylic acids and optional additional comonomers comprises 100% by weight of the copolymer or copolymer blend, wherein the copolymer or the copolymer blend has acid groups wherein at least 20%, but not more than 60% of the total number of acid groups are present in neutralized form, and has an acid number of at least 20 mg KOH/g but not greater than 200 mg KOH/g;

b) at least one water-soluble curing agent, based on inorganic compounds of elements Zr, Ti, and mixtures thereof, and wherein an amount by weight of the at least one water-soluble curing agent, determined as the amount by weight of the elements Zr, Ti and mixtures thereof is set such that, the solids content of the copolymer or the copolymer blend according to component a) divided by the acid number of the copolymer or copolymer blend in grams of KOH/g, is greater than the sum of $0.04 \cdot X_{Zr} + 0.02 \cdot X_{Ti}$ but less than the sum of $0.12 \cdot X_{Zr} + 0.06 \cdot X_{Ti}$, wherein $X_{Zr}$ and $X_{Ti}$ are respective mass fractions of the elements Zr or Ti of the at least one water-soluble curing agent, based on a total amount of the elements Zr and Ti of the curing agent; and wherein the dispersed polymer ingredients of the water-based coating have a D50 value of less than 1 μm;

wherein no more than 0.1% by weight of water-soluble and water-dispersed organic curing agents with amino groups, imine groups or carbodiimide groups are present; and wherein the water-based can inner coating further comprises a positive amount up to 5% by weight of an emulsifier selected from the group consisting of nonionic amphiphiles with an HLB value of at least 8.

21. A water-based can inner coating, according to claim 20 further comprising a positive amount to 10% by weight of a water-miscible organic solvents.

22. A water-based can inner coating, according to claim 21 further comprising 4 to 30% by weight of the copolymer or the copolymer blend in dispersed form.

* * * * *

UNITED STATES PATENT AND TRADEMARK OFFICE
CERTIFICATE OF CORRECTION

PATENT NO. : 10,315,216 B2
APPLICATION NO. : 14/737912
DATED : June 11, 2019
INVENTOR(S) : Ard De Zeeuw et al.

It is certified that error appears in the above-identified patent and that said Letters Patent is hereby corrected as shown below:

In the Claims

Column 9, Line 3 Claim 1: Change "KOH/q" to --KOH/g--.

Signed and Sealed this
Tenth Day of December, 2019

Andrei Iancu
*Director of the United States Patent and Trademark Office*